United States Patent
Levi

(10) Patent No.: US 10,082,248 B2
(45) Date of Patent: Sep. 25, 2018

(54) METAL HYDRIDE DEVICE FOR STORAGE AND TRANSPORTATION OF HYDROGEN

(71) Applicant: Hydro 2 Power S.r.l., Vaprio d'Adda (IT)

(72) Inventor: Marco Levi, Vaprio d'Adda (IT)

(73) Assignee: Hydro 2 Power S.r.l. (IT)

( * ) Notice: Subject to any disclaimer, the term of this patent is extended or adjusted under 35 U.S.C. 154(b) by 0 days.

(21) Appl. No.: 15/391,004

(22) Filed: Dec. 27, 2016

(65) Prior Publication Data

US 2017/0184252 A1    Jun. 29, 2017

(30) Foreign Application Priority Data

Dec. 29, 2015    (EP) .................................. 15425114

(51) Int. Cl.
*F17C 11/00*    (2006.01)
*F17C 13/06*    (2006.01)

(52) U.S. Cl.
CPC ............ *F17C 11/005* (2013.01); *F17C 13/06* (2013.01); *F17C 2201/0157* (2013.01); *F17C 2203/0646* (2013.01); *F17C 2205/0169* (2013.01); *F17C 2205/0311* (2013.01); *F17C 2221/012* (2013.01); *F17C 2227/0302* (2013.01); *F17C 2260/031* (2013.01); *F17C 2270/01* (2013.01); *Y02E 60/321* (2013.01)

(58) Field of Classification Search
CPC .............................. F17C 11/005; F17C 13/06; F17C 2201/0157; F17C 2203/0646; F17C 2205/0169; F17C 2221/012; F17C 2260/031; F17C 2227/0302; F17C 2270/01; Y02E 60/321

See application file for complete search history.

(56) References Cited

U.S. PATENT DOCUMENTS

| | | | | |
|---|---|---|---|---|
| 4,187,092 A * | 2/1980 | Woolley | ................ | C01B 3/0005 34/416 |
| 4,446,111 A * | 5/1984 | Halene | .................. | C01B 3/0005 206/0.7 |
| 6,418,275 B1 * | 7/2002 | Yang | ..................... | H01M 8/065 392/441 |
| 6,991,770 B2 * | 1/2006 | Suzuki | ............... | B01D 53/0407 422/198 |

(Continued)

FOREIGN PATENT DOCUMENTS

WO    97/36819 A1    10/1997

*Primary Examiner* — Chun Cheung
(74) *Attorney, Agent, or Firm* — Laubscher, Spendlove & Laubscher, P.C.

(57) ABSTRACT

The present disclosure concerns a metal hydride device for storage and transportation of hydrogen gas. The device includes a single block having a plurality of inner cavities, each having an opening on a respective surface of the block, a fluid-tight closure member operably placed on each inner cavity at its respective opening, for hydrogen gas-tight sealing of the opening. The block further includes a first inner channel for providing fluid communication for at least some of the cavities, the first inner channel including an opening facing at least one surface of the block, at least one connector operable in a fluid-tight manner on the opening of the inner channel and adapted to be connected to a source of hydrogen gas, and metal powders placed in the inner cavities.

8 Claims, 3 Drawing Sheets

(56) References Cited

U.S. PATENT DOCUMENTS

| | | | | |
|---|---|---|---|---|
| 7,651,554 B2* | 1/2010 | Tan | ................ | B82Y 30/00 |
| | | | | 206/0.7 |
| 8,287,629 B2* | 10/2012 | Fujita | ................ | F17C 11/005 |
| | | | | 206/0.7 |
| 9,746,133 B2* | 8/2017 | Elie | ................ | F17C 11/005 |
| 2001/0004013 A1 | 6/2001 | Morishima et al. | | |
| 2005/0268647 A1 | 12/2005 | Finamore | | |

\* cited by examiner

METAL HYDRIDE DEVICE FOR STORAGE AND TRANSPORTATION OF HYDROGEN

CROSS-REFERENCE TO RELATED APPLICATIONS

This application is a claims priority to European Patent Application No. EP15425114.4 filed Dec. 29, 2015. The entire content of this application is incorporated herein by reference.

FIELD OF THE INVENTION

The present invention relates to a metal hydride device for storage of hydrogen, particularly a device that acts as a cartridge for safe storage and transportation of hydrogen gas, as defined in the preamble of claim 1.

BACKGROUND ART

Hydrogen may be stored and transported as a high pressure gas, as a low-temperature liquid at atmospheric pressure, or in the form of chemicals having hydrogen stably but reversibly bonded thereto. The transportation and storage of hydrogen, especially in gas or liquid form, involve a risk factor that may become extreme, as hydrogen has a broader flammability range than other types of fuels.

The most common transportation method is that of pressurized gas (20-70 MPa) in pipelines and cylinders made of aluminum, steel or carbon-reinforced aluminum for higher pressures.

Nevertheless, this transportation method is affected by the drawback associated with embrittlement of steel caused by the diffusion of atomic hydrogen into the steel.

Such embrittlement may lead to a sudden failure of the cylinder structure, with obviously detrimental consequences.

Since hydrogen liquefies at ambient pressure at a temperature of about 20K, the containers for transportation and storage of liquefied hydrogen must meet extreme thermal insulation requirements.

For this reason, this type of transportation is almost exclusively reserved to specific applications, such as space launchers.

In order to obviate the difficulties of transporting and storing hydrogen, hydrogen-rich chemical compound may be used, such as hydrides, e.g. metal hydrides.

Metal hydrides retain hydrogen due to a reversible reaction with the metal. They are formed and act through absorption and release of hydrogen.

Particularly, the dissociation of the hydrogen molecule allows atomic hydrogen to diffuse into the metal, thereby forming a solid solution. As the concentration of hydrogen increases in the metal, the hydride phase starts to grow, until the metal is entirely in this phase.

This hydrogenation is a reversible process, whereby hydrogen can be released back from the hydride so formed.

Hydrogenation is an exothermic process, i.e. a process that releases large amounts of heat, whereas the release process is endothermic and requires large amounts of heat.

For this reason, transportation and storage of hydrogen using metal hydrides is a safe process.

Prior art metal hydride devices for storage and transportation of hydrogen gas use cylinders designed for storage of high-pressure hydrogen gas, which are filled with metal powders (to form hydrides).

Nevertheless, these commercially available cylinders for storage of high-pressure hydrogen are not suitable to obtain an optimal chemical and kinetic hydrogen absorption and desorption reaction using metal powders because the accumulation of the powders in large-diameter cylinders, like designed and manufactured for high operating pressures and different storage methods, tends to heat to very high temperatures the cylinder during hydrogenation and to overcool during release.

Such considerable heat accumulation and cooling hinder the corresponding processes, which requires the provision of high-performing heat exchangers operating on the cylinder.

In light of the above, the Applicant has suggested the opportunity of optimizing the hydrogen absorption/desorption capacity in metal hydride devices, and particularly the heat exchange between the device and the outside environment.

OBJECT OF THE INVENTION

Therefore, the object of the present invention is to provide a metal hydride device for storage and transportation of hydrogen gas that can obviate the aforementioned drawbacks.

Particularly, the object of the present invention is to provide a metal hydride device for storage and transportation of hydrogen gas that is easy and effective to use.

This object is fulfilled by a metal hydrides storage device for storing and transporting hydrogen as defined in one or more of the annexed claims.

BRIEF DESCRIPTION OF THE DRAWINGS

Further features and advantages of the metal hydride device for storage and transportation of hydrogen gas according to the present invention, will be apparent from the following description of one preferred embodiment thereof, which is given by way of illustration and without limitation with reference to the accompanying figures, in which.

DETAILED DESCRIPTION

Figure 1:
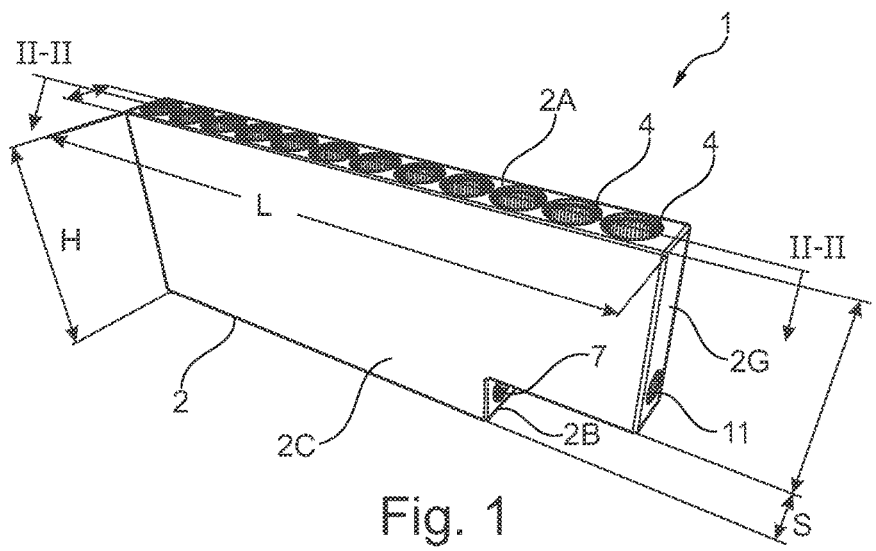
FIG. 1 shows a perspective view of the metal hydride device for storage and transportation of hydrogen gas of the present invention.

Referring to the accompanying figures, numeral 1 generally designates a metal hydride device for storage and transportation of hydrogen gas according to the present invention.

The metal hydride device for storage and transportation of hydrogen gas comprises a single block 2 having a plurality of inner cavities 3, each defining an opening 4 on at least one surface 22 of the block 2.

The metal hydride device for storage and transportation of hydrogen gas comprises a fluid-tight closure member 5 operably placed on each inner cavity 3 at its respective opening 4, for hydrogen gas-tight sealing of such opening 4.

Figure 4A:
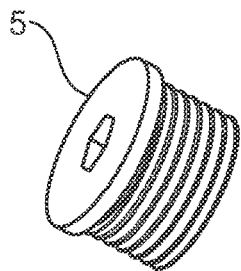
FIGS. 4A, 4B, and 4C show detailed views of certain elements as used in FIG. 3.

The closure member 5, also referring to FIG. 4A, comprises a seal (not shown) and a closing flange. This flange is preferably designed to be entirely embedded.

The closure member 5 also comprises, still referring to FIG. 4A, threads and a hex slot at its top for easier fastening thereof into the inner cavity 3.

The closure member 5 is tested to ensure that it can operate at pressures tens of times higher than the low operating pressures involved.

In one aspect, the closure member 5 may be sealed using appropriate non-removable resins to ensure opening or removal of the member.

In a preferred embodiment of the present invention, the closure member 5 consists of a plug.

In one aspect, the block 2 comprises a first inner channel 6 for providing fluid communication of at least some of these cavities 3.

Particularly, this inner channel 6 comprises an opening 7 that faces at least one surface 2B of this block 2, which may be other from or the same as the surface with the openings 4.

The metal hydride device for storage and transportation of hydrogen gas 1 comprises at least one connector 8 which is operable is a fluid-tight manner on such opening 7 of such inner channel 6.

This connector 8 is designed to be connected to a hydrogen gas source which acts as a refill (not shown) or to an application for later consumption and use, and is adapted to retain the metal powders (or sands) situated in the inner cavities, using an appropriate filter of appropriate mesh size.

The metal powders contained in the inner channel 6 are typically classified as AB2 and AB5 and are typically used in the art as required by the desired charging pressures.

For example, the metal powder AB2 is used to minimize the pressure required by the process and hence the power consumption of electrolyzers.

Figure 4B:
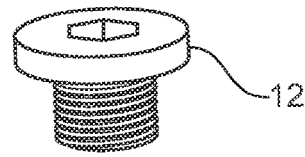
Figure 4C:
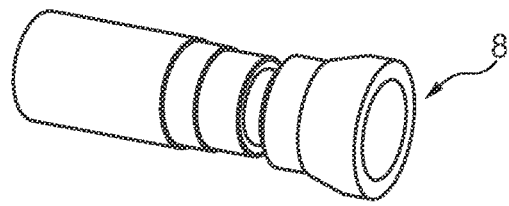

The connector 8, also referring to FIG. 4C, is a female or male quick connector with an incorporated check valve (or with a knob for higher-capacity embodiments of the device 1) that can safely stop the flow in case of disconnection, both during charging and discharging of the device 1.

Therefore, the connector 8 acts as a safe, practical and quick coupling for charging and discharging hydrogen.

As shown in the accompanying figures, in a preferred embodiment, the block 2 of the metal hydride device for storage and transportation of hydrogen gas is a prism-shaped body.

Preferably the block 2 has preset length L, height H and depth S dimensions, and particularly its depth S is smaller than the other two length L and height H dimensions.

In a preferred embodiment, the block 2 is a right prism-shaped body and defines two flat, parallel and opposed larger surfaces 2C and 2D.

Such larger surfaces 2C and 2D are delimited:
at their top by the preferably flat surface 2A, in which the openings 4 are formed;
at their bottom by a preferably flat surface 2E, which is parallel and opposed to the surface 2A;
and at their sides by two additional preferably flat surfaces 2F, 2G, which are parallel and opposed to each other and preferably perpendicular to the surfaces 2A and 2E.

These flat surfaces maximize heat exchange with a fluid or a bath in which the device 1 may be placed during hydrogen charging/discharging.

In one embodiment, not shown, the two larger surfaces 2C and/or 2D of the device 1 may also comprise cooling fins, i.e. a passive heat dissipation system, to assist heat exchange and improve the efficiency of hydrogen charging and discharging into and from the device.

The flat surfaces also allow stacking of multiple devices 1, as well as the formation of appropriate racks having appropriate seats, each designed to receive one device. These racks facilitate transportation and handling of a plurality of devices 1.

In one aspect, the inner cavities 3 have a preferably cylindrical shape.

In one aspect, the inner cavities 3 having a substantially cylindrical shape are obtained by mechanical removal of material from mentioned block.

Each of these cylindrical inner cavities 3 defines an axis X-X which extends, as shown, for instance, in the accompanying figures, between the aforementioned surfaces 2A and 23, although they may also extend between the two surfaces 2F and 2G.

These cavities 3 are arranged parallel to one another, thereby lying on the same plane.

Figure 2:
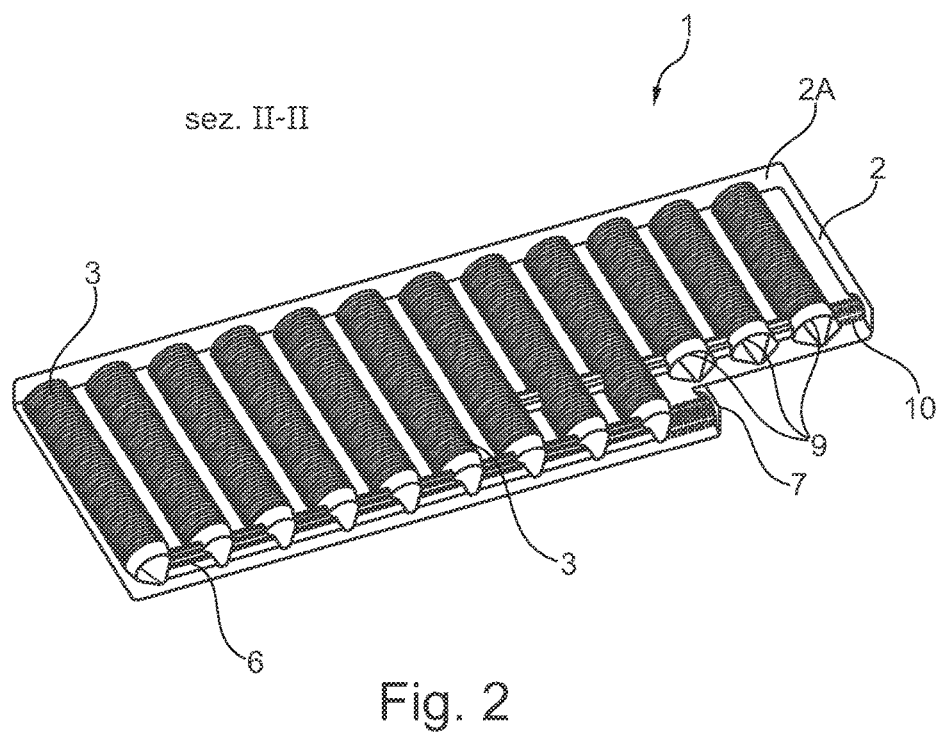
FIG. 2 shows a cross sectional view as taken along line II-II of FIG. 1.
Figure 3:
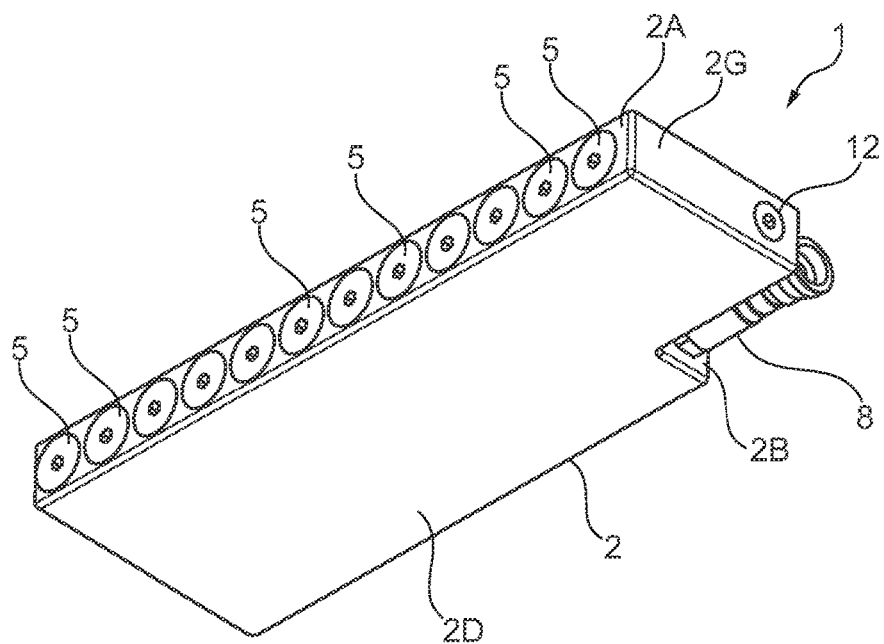
FIG. 3 shows a further perspective view of the metal hydride device for storage and transportation of hydrogen gas of the present invention in an operating configuration.
Figure 5:
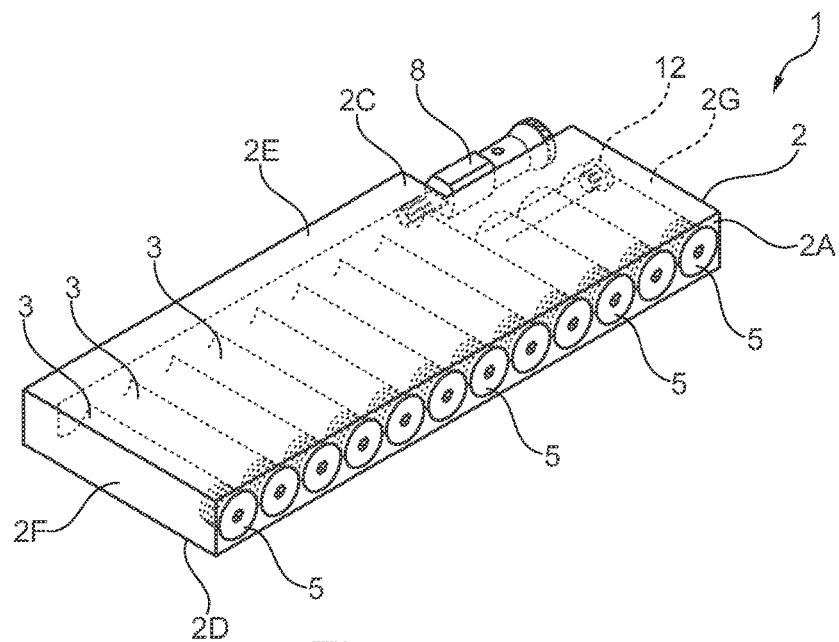
FIG. 5 shows a ghost perspective view of the metal hydride device for storage and transportation of hydrogen gas of FIG. 3.

In one aspect of the present invention, also referring to FIGS. 2 and 5, each of these inner cavities 3 has threads extending along the entire inner surface of the cavity.

Advantageously, these threads can maximize the inner volume of each cavity 3, as well as heat exchange.

The threads are, for example, helical threads formed by tapping the inner surface of the cavity 3.

In addition to the first plurality of inner cavities 3, the metal hydride device for storage and transportation of hydrogen gas 1 also comprises a second plurality of inner cavities 9.

As shown by the accompanying figures, the inner cavities 3 and 9 are designed to be formed between the surfaces 2A and 2E.

In one aspect, the first plurality of inner cavities 3 and the second plurality of inner cavities 9 are in fluid communication with each other through a second inner channel 10.

Such second inner channel 10 comprises an opening 11 that faces at least one surface of the block 2, particularly the surface 2G of the block.

In one aspect, the second inner channel 10 provides communication between the second plurality of inner cavities 9 and at least one of the first plurality of inner cavities 3.

Figure 6:
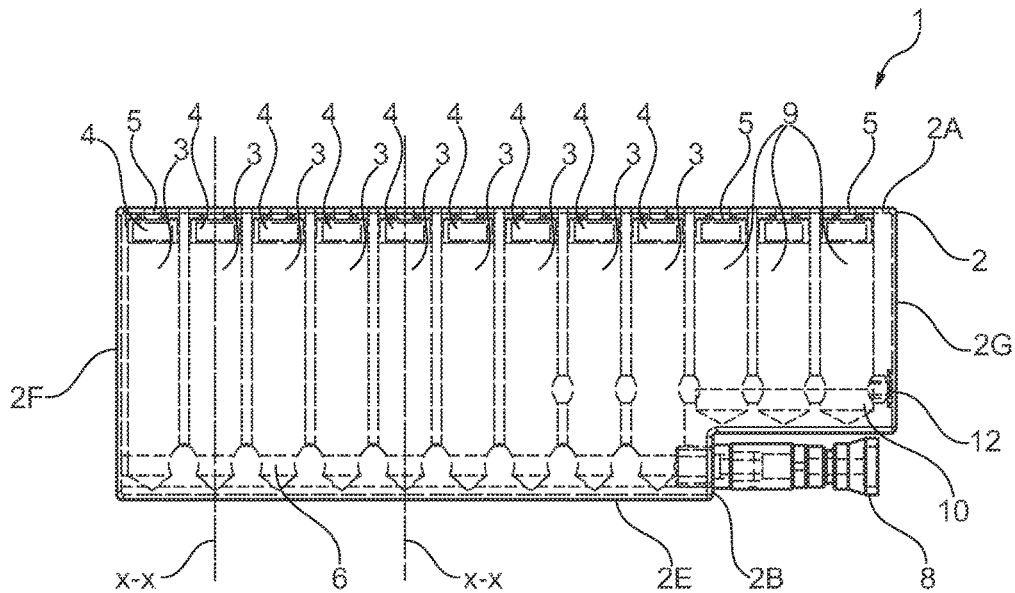
FIG. 6 shows a top sectional view of the device of FIG. 5.

Preferably, as exemplified in FIG. 6, the second inner channel 10 provides communication between the second plurality of inner cavities 9 and two cavities of the first plurality of inner cavities 3.

It should be noted that the first channel 6 and the second channel 10 extend in parallel directions but at different heights, which means that they do not extend on the same axis.

The second channel 10 is also obtained by mechanical removal of material from the block 2.

In one aspect, the second inner cavities 9 also have threads extending along the entire inner surface of the cavities.

Advantageously, these threads can maximize the inner volume of each cavity 9, as well as heat exchange.

The threads are, for example, helical threads formed by tapping the inner surface of the cavity 9.

It shall be noted that a fluid-tight closure member 12 operably placed on the opening 11.

The closure member 12, also referring to FIG. 4B, is for instance a plug equipped with a seal, and able to withstand pressure stresses well above the operating pressure limits of the device. Particularly it also comprises threads and a hex slot at its top for easier fastening thereof into the inner cavity 9.

In a preferred embodiment of the metal hydride device for storage and transportation of hydrogen gas, the block 2 is made of aluminum, due to the high machinability and light weight of this material, as well as its ability to impart high resistance to hydrogen embrittlement.

In a preferred embodiment of the metal hydride device 1 for storage and transportation of hydrogen gas, the ratio of the volume of metal powders to the volume of the cavity ranges from 70% to 95%.

This ratio may vary within this range to maximize storage capacity of a device of a given size.

It shall be noted that the metal hydride device 1 acts as a cartridge for storage and transportation of hydrogen gas and is considerably advantageous as compared with the prior art commercially available devices. Thus, assuming that the device has the following dimensions:

L=12×H=10×S=3 cm, then the volume of the device 1 would be 0.12 L, and if a single device having a pressure of 200 bar were provided, it would store 24Nl hydrogen (like current commercially available storage devices) however, due to a highly concentrated provision of metal powders, and especially due to the presence of the inner cavities 3 and/or 9, also having inner threads, it features a storage capacity of 80 Nl;

L=32×H=12×S=3 cm, then the volume of the device 1 would be 0.48 L, and if a single device having a pressure of 200 bar were provided, it would store 96Nl hydrogen. (like current commercially available storage devices) however, due to a highly concentrated provision of metal powders, and especially due to the presence of the inner cavities 3 and/or 9, also having inner threads, it features a storage capacity of 350 Nl;

Obviously, those skilled in the art may make a number a changes and variants to the invention as described above, e.g. to the section, depth and construction of the powder-receiving cavities, the arrangement and number of the cavities, the formation of additional through cavities parallel to the other cavities and designed for the passage of cooling or heating fluid, surface flanges on the plate machined for optimized heat exchange, without departure, from the scope of the invention, as defined in the following claims.

The invention claimed is:

1. A metal hydride device for storage and transportation of hydrogen gas, comprising:
   a) a single block containing a plurality of inner cavities, each cavity having an opening on a respective surface of said block and including threads that extend along an inner surface of the cavity;
   b) a fluid-tight closure member placed on each inner cavity at its respective opening for hydrogen gas-tight sealing of such opening;
   c) said block further containing a first inner channel for providing fluid communication of at least some of the cavities, said first inner channel comprising an opening facing at least one surface of said block ;
   d) at least one connector operable in a fluid-tight manner on said opening of said inner channel and adapted to be connected to a source of hydrogen gas; and
   e) metal powders placed in said inner cavities.

2. The metal hydride device as defined in claim 1, wherein said inner cavities have a substantially cylindrical shape and are obtained by mechanical removal of material from said block.

3. The metal hydride device as defined in claim 1, Wherein said block comprises a prism-shaped body and defines two flat, parallel and opposed larger surfaces, said two larger surfaces being delimited
   at their top by a first surface in which said openings of said inner cavities are formed, at their bottom by a second surface which is parallel and opposed to said first surface,
   and at their sides by two additional surfaces, which are parallel and opposed to each other.

4. The metal hydride device as defined in claim 3, wherein said prism-shaped body is a right prism-shaped body and said first surface, said second surface and the two additional surfaces are flat.

5. The metal hydride device as defined in claim 3, wherein said plurality of inner cavities extend between said first surface and said second surface.

6. The metal hydride device as defined in claim 3, and further comprising
   a first plurality and a second plurality of inner cavities; said first plurality of inner cavities and said second plurality of inner cavities being in fluid communication with one another through a second inner channel comprising an opening that faces at least two further surfaces; and
   a fluid-tight member operably placed on said opening that faces at least two further surfaces.

7. The metal hydride device as defined in claim 1, wherein said block is made of aluminum.

8. The metal hydride device as defined in claim 1, wherein a ratio of the volume of metal powders to the volume of the cavity ranges from 70% to 95%.

\* \* \* \* \*